United States Patent [19]

Crum

[11] Patent Number: 4,692,567

[45] Date of Patent: Sep. 8, 1987

[54] ELECTRIC FENCE HOLDER

[76] Inventor: Donald L. Crum, R.R. #4, Box 108, Carlinville, Ill. 62626

[21] Appl. No.: 733,874

[22] Filed: May 14, 1985

[51] Int. Cl.[4] ........................ H01B 17/16; A01K 3/00

[52] U.S. Cl. ................................ 174/158 F; 174/160; 174/161 F; 174/175; 256/10; 264/297.1

[58] Field of Search ............... 174/158 F, 160, 161 R, 174/161 F, 163 F, 174, 175; 248/65, 66, 74.2, 296; 249/158; 256/3, 10, 11, 32, 34, 35, 36, 47, 48, 49, 50, 51, 52, 54, 58

[56] References Cited

U.S. PATENT DOCUMENTS

| | | | |
|---|---|---|---|
| 466,932 | 1/1892 | Cornell | 256/35 X |
| 522,818 | 7/1894 | Baer | 256/58 |
| 602,444 | 4/1898 | Haffey | 256/35 |
| 617,442 | 1/1899 | Leatherman | 256/35 |
| 825,916 | 7/1906 | Mahaffy | 256/35 |
| 1,514,053 | 11/1924 | Keeter | 249/158 |
| 2,317,249 | 4/1943 | Brickman | 248/66 |
| 2,599,849 | 6/1952 | Lenz | 174/160 |
| 2,805,277 | 9/1957 | Moeller | 174/158 F X |
| 3,001,765 | 9/1961 | Shobert | 256/10 |
| 3,531,090 | 9/1970 | Laible | 174/161 F X |

FOREIGN PATENT DOCUMENTS

| | | | |
|---|---|---|---|
| 420690 | 2/1911 | France | 256/35 |
| 1258501 | 12/1971 | United Kingdom | 174/175 |

*Primary Examiner*—Laramie E. Askin
*Attorney, Agent, or Firm*—Rogers, Howell, Moore & Haferkamp

[57] ABSTRACT

An electric fence holder. Two embodiments can be produced from a common mold cavity. Both embodiments comprise a strap formed of resilient plastic with a wire retaining bracket formed at the center. The first embodiment is longer than the second and has clamps at its ends for engaging the strands of an existing fence. The second embodiment, formed by blocking the outer portions of the mold cavity, has holes in its ends for mounting the strap on a stake that has been driven into the ground. In both embodiments an electrically conductive wire is held by the wire-retaining bracket out of grounding contact with the existing fence or stake. Flexing either strap into a bow for installation locks the conductive wire in place.

10 Claims, 9 Drawing Figures

ELECTRIC FENCE HOLDER

BACKGROUND OF THE INVENTION

This invention relates to an electric fence holder and more particularly to an electric fence holder constructed entirely of resilient plastic material that can be installed on an existing fence, regardless of the location of the fence posts, to support an electrically conductive wire and project it laterally away from the existing fence.

There have been a number of efforts to solve the problems of quick installation of an electric fence with means that avoid shorting of the electric fence. United States patents which describe and illustrate various ones of these efforts include Lenz U.S. Pat. No. 2,599,849; Wilson U.S. Pat. No. 3,752,902; Laible U.S. Pat. No. 3,531,090; Young U.S. Pat. No. 1,564,168; Oltmanns U.S. Pat. No. 3,684,247; Heuberger U.S. Pat. No. 3,759,490; Pope et al. U.S. Pat. No. 4,216,943; and Varela-Hernandez U.S. Pat. No. 4,436,284.

The Lenz patent discloses an electric fence holder comprising metal wires that are twisted together to make rigid legs. There is a hook element at each end of the legs adapted to be hooked onto strands of an existing fence. An insulator is attached to the apex defined by the intersection of the legs, and the insulator has a groove in which an electric wire can rest or about which it can be wrapped. Problems with the fence holder disclosed in the Lenz patent are that it does not positively hold an electric wire. The electric wire must either be rested in the upper portion of an annular groove or it must be wrapped about the insulator groove. Also the Lenz patent is made of metal except for the insulator and, therefore, there is the risk that the electrically conductive wire can contact the legs of the fence holder and be shorted out.

The Wilson electric fence holder describes a metal strap that can be bent to be fitted onto a metal post that would be stuck into the ground. The entire structure of the Wilson patent is metal except for the insulator so, again, the electrically conductive wire can contact a portion of the metal and be shorted out.

The Laible patent discloses an electric fence holder similar to the one disclosed in the Wilson patent except that the strap in the Laible patent is made of an electrically insulated material instead of metal. Nevertheless, the Laible patent requires a separate post be installed in the ground. The Laible patent also does not disclose a simple electric fence holder that can be installed on an existing fence.

The remaining patents referred to show various features that indicate the nature of the art.

SUMMARY OF THE INVENTION

This invention comprises an electric fence holder formed as a unitary resilient plastic strap. There are two preferred embodiments, and a particular feature of the invention is that, because of the configuration of the straps, either embodiment can be produced from a single mold, thus avoiding the large cost of two separate molds. The design of the electric fence holder also permits either embodiment to be molded in a single step.

In the first embodiment, a wire-retaining bracket is formed at the center of the strap to engage an electrically conductive fence wire. At the opposite ends of the strap, clamps are formed to snap about two spaced strands of an existing fence.

The material from which the strap is made is a resilient plastic having an internal memory that biases the strap toward a normally flat condition and biases the clamps to a normally closed condition. The strap is longer than the normal spacing between fence strands, whether the strands be the two most closely adjacent to one another or be strands with one or more intermediate strands between them. What is significant is that, when the clamps are applied to two horizontal strands of an existing fence, the effect is to bow the strap and displace its center laterally away from the existing fence by a significant distance. Likewise, because the strap is resilient and yet flexible, it can be bowed to adjust the distance between the ends where the clamps are located to accommodate a variety of spacing between the horizontal strands of an existing fence.

At the center of the strap, the wire-retaining bracket is in the form of a loop between a pair of stiff, but yieldable, stops cantilevered from the strap. The area between the loop and the stops can receive and retain a wire that is electrically conductive. The relative configuration of the loop and stops is such that, when the strap is flat, or even inversely bowed, a conductive wire can be easily snapped into the space between the loop and stops. Even if the conductive wire is taut from already having been strung, the taut wire can be snapped into this retention position. Thereafter, when the strap is bowed for clamping to an existing fence, the stops are pressed toward the loop, effectively closing it.

The second embodiment of the invention is produced by blocking the outer portions of the mold cavity and molding only the central portion of the strap, creating a short strap with a hole in each of its two ends. The central wire-retaining bracket is the same as described above. However, this second embodiment of the electric fence holder is adapted to be mounted on a stake, typically a steel rod, that is driven into the ground. The holes in the ends of the strap receive the rod and hold the strap in a bowed condition.

An object of this invention is to provide an electric fence holder that can be attached to an existing fence without regard to locations of the fence posts and that eliminates the shorting that has heretofore occurred with prior art electric fence holders.

Another object of the invention is to provide an electric fence holder that, in one embodiment, requires no stakes for installation and that, to the contrary, can be installed on an existing fence.

Another object of the invention is to provide an electric fence holder that, in a second embodiment, comprises a single-piece molded plastic strap that can mount on a steel rod and retain a conductive wire out of contact with the rod.

Another object of the invention is to provide a form of electric fence holder that can be produced in a single molding step and that has two embodiments, either of which can be produced from a common mold.

Another object of the invention is to provide an electric fence holder that can be easily and quickly clamped to an existing fence and to which an electrically conductive wire can be easily and quickly engaged.

Still another object of the invention is to provide an electric fence holder that is especially adapted for installation to an existing fence and that can be attached at places where the existing fence is bowed or warped to assure displacement of an electrically conductive wire laterally of the most extreme projections of the existing fence, thereby avoiding grounding of the conductive wire.

Another object of the invention is to provide an electric fence holder constructed of a resilient plastic wherein the natural resilience of the plastic biases the strap toward a flat condition to help hold the strap in place once it is snapped onto the strands of an existing fence.

Still another object of the invention is to provide an electric fence holder that is formed of insulating material, that can be attached to an existing fence, and that can interlock with an electrically conductive wire even if the wire has already been strung in taut condition. A corollary object is to provide such a fence holder that can be installed at a selective location or locations to supplement the support of an already installed electric fence.

DETAILED DESCRIPTION OF PREFERRED EMBODIMENTS

Figure 1:
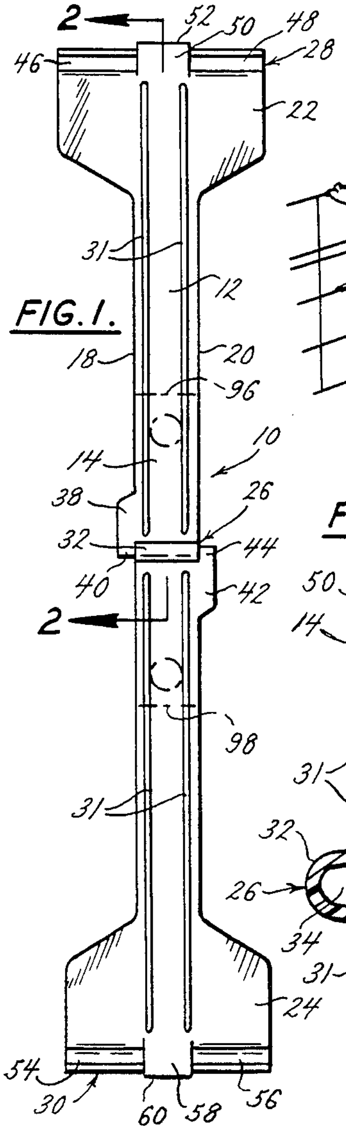
FIG. 1 is a front elevation view of the electric fence holder.

FIG. 1 illustrates an electric fence holder 10 that represents the first embodiment of this invention. The electric fence holder 10 comprises a strap 12 having a front face 14, a rear face 16, left and right side edges 18 and 20, and opposed ends 22 and 24. A wire retainer 26 is formed intermediate the ends 22 and 24. Fence strand clamps 28 and 30 are formed at the ends 22 and 24 and these will be described hereinafter.

Although the strap 12 may be flat, it preferably is formed with reinforcing ribs, such as pairs of ribs 31 on opposite sides of the wire retainer 26. These ribs 31 can terminate short of the fence strand clamps 28 and 30, particularly if the ends 22 and 24 are widened as illustrated.

Figure 2:
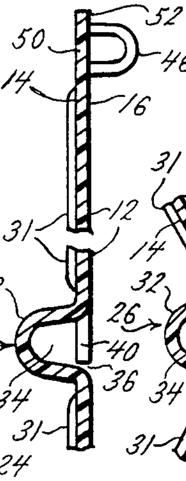
FIG. 2 is an enlarged view in section taken along the plane of the line 2—2 in FIG. 1, with parts broken away.
Figure 3:
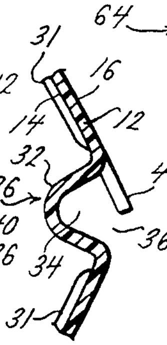
FIG. 3 is an enlarged view in section of the wire retaining bracket portion of FIG. 2, showing the strap flexed inversely for easy introduction of a wire.
Figure 5:
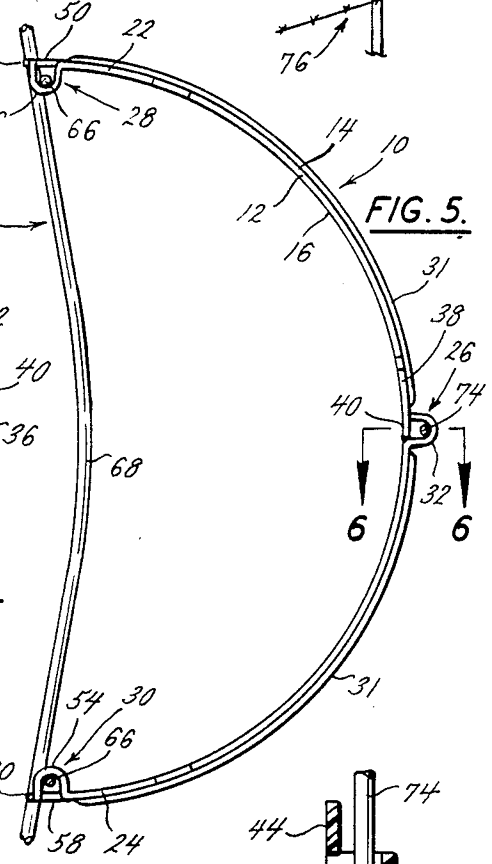
FIG. 5 is an enlarged side elevation view in section taken along the plane of the line 5—5 of FIG. 4.

The wire retainer 26 comprises a transverse curvature 32 formed in the strap 12 during the molding process. The transverse curvature 32 defines a cavity 34 having an open side 36 generally flush with the rear face 16 of the strap 12. On one side of the transverse curvature 32, the strap 12 has a portion 38 forming an extension of the width of the strap and leading to a cantilevered tab 40 that extends longitudinally past a side of the opening 36. Likewise, another sidewardly extending portion 42 of the strap 12 has a cantilevered tab 44 extending longitudinally past the other side of the opening 36. When the strap is in its flat condition, as particularly illustrated in FIG. 2, the tabs 40 and 44 just about span the space 36. However, if the strap 12 is inversely flexed as illustrated in FIG. 3, the cavity 34 will be widened and the tabs 40 and 44 will be swung away from the cavity 34. This makes the open side 36 of the cavity 34 accessible to the introduction of a wire into the cavity 34.

At one end 22 of the strap 12, the clamp 28 comprises two hook sections 46 and 48 that have a space between them. A tab 50 extends from the strap 12 and acts as a cantilever between the hook sections 46 and 48. The outer end 52 of the tab is slightly beyond the hook sections 46 and 48 so that it can be engaged by a wire to press the tab 50 away from the hook sections 46 and 48. Similarly, At the other end 24 of the strap 12, the clamp 30 includes two spaced hook sections 54 and 56. Similarly, a tab 58 that is an extension of the strap 12 acts as a cantilever between the hook sections 54 and 56. The end 60 of the tab 58 extends a short distance beyond the hook sections 54 and 56. It should be noted that the hook sections 46 and 48 and the hook sections 54 and 56 all open toward the front face 14 of the strap 12. Thus, the clamps 28 and 30 may be essentially identical.

As FIG. 1 clearly illustrates, the outer ends 22 and 24 are wider than the central body of the strap 12. For example, if the ends 22 and 24 are about three inches wide and the central body is almost one inch wide, the central body can flex in a bow or inversely as shown in FIG. 3, while the ends 22 and 24 remain more rigid, which makes installation easier. Also, the wider ends allow an overall wide span of the clamps 28 and 30, opposing swinging of the holder 10 about a vertical axis after installation.

Figure 4:
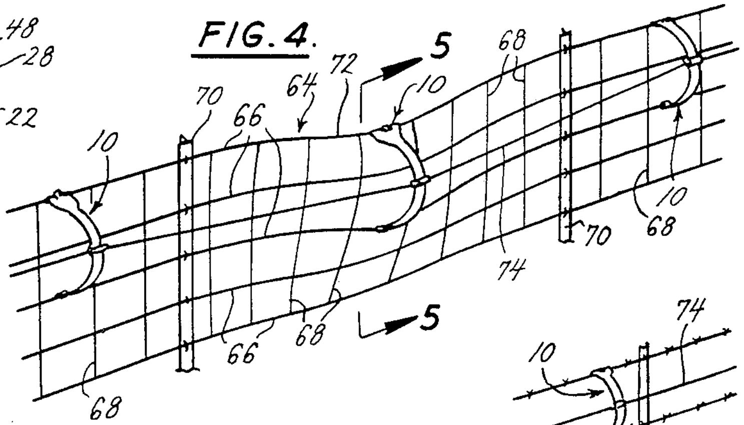
FIG. 4 is a perspective view of an existing fence showing installation of several of the electric fence holders to support an electric fence wire.

FIG. 4 illustrates the installation of several of the electric fence holders 10 on an existing conventional fence 64. The fence 64 is a typical one that almost always has a plurality of horizontal metal wire strands 66 that are spaced and that are tied to a plurality of spaced vertical strands 68. The fence 64 is supported by spaced vertical posts 70, usually of metal or wood, that are driven into the ground. An existing fence like the fence 64 would ground an electrically-conductive wire that contacted it and short the wire.

For illustration purposes, the fence 64 is shown with a section 72 that has been bowed outwardly from some applied force, such as that of an animal pressing against the fence. The illustration of FIG. 4 shows the installation of several electric fence holders 10 holding an electrically conductive wire 74 at their fence retainers 26. By installing one of the fence holders 10 at the bow 72, the electrically-conductive wire fence 74 supported by the fence holders 10 will follow the irregular line of the existing fence 64 and avoid being shorted in spite of deformed sections like the section 72.

Figure 9:
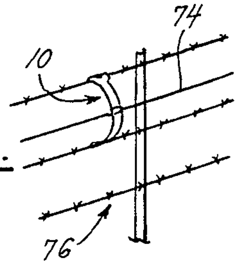
FIG. 9 is a perspective view of an existing barbed wire fence with this electric fence holder installed on it.

It should be noted that this electric fence holder 10 can also be installed on an existing barbed wire fence 76. Such an installation is shown in FIG. 9.

To install this electric fence holder 10, it is easiest to first snap the wire retainer portion 26 onto the electric wire 74. This can be done by holding the two arms of the strap 12 so that, if the wire 74 is already in place carrying an electric charge, manual contact is avoided. If the two arms are flexed forwardly, as illustrated in FIG. 3, the tabs 40 and 44 will swing away from the cavity 34 providing access to the open side 36 and allowing the wire 74 to be introduced to the cavity 34. Then when the arms of the strap 12 are released, the strap will return to its generally flat condition as illustrated in FIG. 2, and the tabs 40 and 44 will swing to their normal positions closing the opening 36. When the strap 12 is bowed rearwardly so that its rear face 16 is concave (and its front face 14 is convex), the tabs 40 and 44 pivot even further inwardly of the cavity 34, effectively containing the electrically-conductive wire 74 and blocking its escape from the cavity 34.

Next, an end, such as the upper end 22 of the strap 12, is clamped onto a selected strand 66 of the fence 64. This is done most easily by grasping the end 22 and pressing the rear face 16 of the end 52 of the tab 50 into contact with the horizontal strand 66 to flex the tab 50 away from the hook members 46 and 48. This allows the strand 66 to pass between the hook members 46 and 48 and the tab 50 into the sockets of the hook sections. When the pressure is released, the tab 50 springs back to the position shown in FIG. 4, and the strand 66 is clamped in place.

Clamping of the lower end 24 onto another horizontal strand 66 is done in the same manner as was the upper strand. The selection of the two strands 66 should be such that the span between them allows the strap 12 to assume the bowed condition shown in FIG. 4, laterally displacing the wire retainer section 26 from the fence 64.

Figure 7:
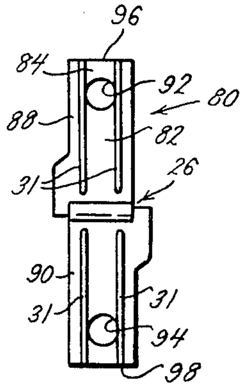
FIG. 7 is a front elevation view of a second embodiment of the invention.
Figure 8:
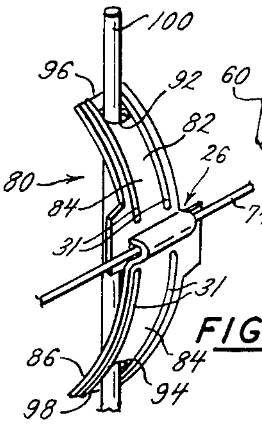
FIG. 8 is a perspective view of the embodiment of FIG. 7 as installed on a stake and supporting an electric fence wire.
Figure 6:
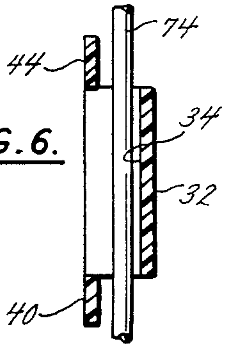
FIG. 6 is an enlarged view in section taken along the plane of the line 6—6 of FIG. 5.

FIGS. 7 and 8 illustrate the second embodiment of the invention wherein an electric fence holder 80 comprises a much shorter strap 82 having front and rear faces 84 and 86, respectively. The wire-retaining section 26 of the electric wire holder 80 is identical to the wire-retaining section 26 of the wire holder 10 and need not be re-described. The difference is that the wire holder 80 has upper and lower arms 88 and 90 with holes 92 and 94, respectively, through them. The upper and lower edges 96 and 98, respectively, of the arms 88 and 90 correspond to the dotted lines 96 and 98 drawn for identification purposes on the fence holder shown in FIG. 1.

Installed, the electric fence holder 80 is mounted upon a stake 100 such as a steel rod that is driven into the ground. Since the holes 92 and 94 are only slightly larger than the diameter of the stake 100, the contact of the edges of the holes 92 and 94 with the stake causes the strap 82 to bow as illustrated in FIG. 8 with the front face 84 being convex and the rear face 86 being concave. This displaces the electrically-conductive wire 74 laterally from the stake 100 and prevents grounding. It is significant that the entire electric fence holder 80 is of a single-piece molded plastic form, all of which is an electrical insulator.

It should be noted that the electric fence holder 10 can be molded in a single step in a mold cavity. In the same mold, the electric fence holder 80 can be cast by simply blocking off the portions of the mold above and below the dotted lines 96 and 98. Both fence holders 10 and 80 can be formed in a single molding step because the hook sections 46, 48, 54 and 56 have an open side that is unobstructed, allowing the opposing sections of a mold to form the strap, the hook portions, the tabs and all areas of both holders 10 and 80, after which the mold sections can be separated from the finished molded product.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

What is claimed is:

1. An electric fence holder to support an uninsulated electrically conductive fence wire from a fence of the kind having at least two parallel wire strands, said electric fence holder comprising a flexible resilient strap having opposite ends, the strap being a unitary member of molded, resilient, electrical insulating plastic, the strap being generally flat when in an unstressed condition, means integral with the strap and at opposite ends thereof for connecting the opposite ends of the strap to two wire strands of a fence and for restraining the ends of the strap in positions causing a medial portion of the strap between the ends to form a bow projecting laterally away from a fence when attached thereto, a cavity formed in the strap and having an open side, the cavity being adapted to receive an uninsulated electrically conductive fence wire therewithin, and resilient blocking means integral with the strap and adjacent a side of the cavity and biased to normally block release of an uninsulated electrically conductive fence wire from the cavity, the resilient blocking means comprising at least one tab projecting from the strap as a cantilever adjacent and generally in the plane of the open side of the cavity.

2. The electric fence holder of claim 1 wherein there are two tabs on opposite sides of the cavity, both tabs projecting as a cantilever adjacent and generally in the plane of the open side of the cavity.

3. The electric fence holder of claim 1 including a plurality of reinforcing ribs formed in the strap on opposite sides of the cavity along the length of the strap.

4. The electric fence holder of claim 1 wherein the connecting means at the ends of the flexible strap have laterally spaced edges to contact the two wire strands and resist pivoting of the strap about a vertical axis when the strap is attached to the two wire strands.

5. The electric fence holder of claim 4 wherein the connecting means are at least two inches wide to provide the said resistance to pivoting of the strap.

6. The electric fence holder of claim 1 wherein the connecting means comprises hooks at the ends of the strap, the hooks having concave closed sides and having openings opposite thereto toward a common face of the strap whereby the resilience of the strap when formed as a bow causes the closed sides of the hooks to bear against the said two parallel wire strands.

7. The electric fence holder of claim 6 including a tab extension at each end of the strap adjacent the respective hooks for blocking release of the two wire strands.

8. An electric fence holder for supporting an uninsulated electrically conductive wire from a fence wherein the fence is of the kind having parallel wire strands, comprising a flexible, resilient strap formed of electrical insulating material creating a bias toward a normally flat condition, the flexible strap having opposite ends and being yieldable to manual pressure applied toward the ends directed against a common side of the strap tending to shape the strap in the form of a bow moving the ends toward one another, means at the opposite ends of the flexible strap defining clamps for engaging two parallel wire strands of a fence upon moving the ends of the strap toward one another and projecting the apex of the bow created thereby laterally away from the existing fence, the means defining clamps comprising hooks at the ends of the strap, the hooks having concave closed sides and having openings opposite thereto toward a common face of the strap whereby the resilience of the strap when formed as a bow and attached to said two wire strands causes the closed sides of the hooks to bear against the said two parallel wire strands, and means on a face of the flexible strap at the apex of the bow for retaining the uninsulated electrically conductive wire comprising a transverse curvature defining a cavity in the strap with an open side in a face of the strap, said common face being opposite the face having the open side of the cavity, whereby when the strap is in the form of a bow as aforesaid, the opening of the cavity is restricted.

9. The electric fence holder of claim 8 including a tab extension of the strap adjacent the cavity for blocking release of the uninsulated electrically conductive wire.

10. An electric fence holder to support an uninsulated electrically conductive wire from and free from contact with a fence wherein the fence has two generally parallel wire strands, the electric fence holder comprising a flexible, resilient strap having opposite ends, the strap being a unitary member of molded, resilient, electrical insulating plastic, the strap being biased toward a generally flat condition when unstressed, yieldable clamp means formed in the opposite ends of the strap for receiving and releasbly clamping said two wire strands to thereby connect the opposite ends of the strap to said two wire strands to restrain the ends of the strap in positions causing a medial portion of the strap between the ends to resiliently form a bow projecting laterally away from the fence when the strap is attached thereto, the clamp means having walls defining hook portions facing in the direction of the bow for receiving said two wire strands and for being pressed thereagainst by the resilience of the strap to thereby cooperate with said resilience in holding the wire strands in the clamp means, a cavity formed in said medial portion of the strap and having an open side, the width and depth of the cavity being such as to enable receipt of an uninsulated electrically conductive wire therewithin, and resilient blocking means biased to normally block release of an uninsulated electrically conductive wire from the cavity when inserted therein, and when the strap is attached to a fence, the bow of the medial portion causing the uninsulated electrically conductive wire to be displaced from contact with the fence.

* * * * *